US012697933B2

(12) United States Patent
Narita et al.

(10) Patent No.: US 12,697,933 B2
(45) Date of Patent: Aug. 4, 2026

(54) ON-BOARD POWER SUPPLY APPARATUS

(71) Applicants: AutoNetworks Technologies, Ltd., Yokkaichi (JP); Sumitomo Wiring Systems, Ltd., Yokkaichi-shi (JP); Sumitomo Electric Industries, Ltd., Osaka (JP)

(72) Inventors: Yuki Narita, Yokkaichi (JP); Seiji Takahashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 19/122,930

(22) PCT Filed: Oct. 26, 2022

(86) PCT No.: PCT/JP2022/039873
§ 371 (c)(1),
(2) Date: Apr. 21, 2025

(87) PCT Pub. No.: WO2024/089787
PCT Pub. Date: May 2, 2024

(65) Prior Publication Data
US 2026/0131747 A1 May 14, 2026

(51) Int. Cl.
*G01R 31/327* (2006.01)
*B60R 16/033* (2006.01)
(Continued)

(52) U.S. Cl.
CPC .............. *B60R 16/033* (2013.01); *H02J 1/10* (2013.01); *H02J 7/345* (2013.01)

(58) Field of Classification Search
CPC .................................................... B60R 16/033
See application file for complete search history.

(56) References Cited

U.S. PATENT DOCUMENTS

2020/0258706 A1 8/2020 Masuda
2021/0194242 A1* 6/2021 Eglseer .................. B60L 53/00
(Continued)

FOREIGN PATENT DOCUMENTS

CN 107571739 A 1/2018
JP 2009-089535 A 4/2009
JP 2020-096480 A 6/2020

OTHER PUBLICATIONS

International Search Report, Application No. PCT/JP2022/039873, mailed Dec. 27, 2022. ISA/Japan Patent Office.

*Primary Examiner* — Menatoallah Youssef
*Assistant Examiner* — Esayas G Yeshaw
(74) *Attorney, Agent, or Firm* — Brooks Kushman P.C.

(57) ABSTRACT

An on-board power supply apparatus is for use in an on-board power supply system. The on-board power supply system includes a battery, an electric power path to which electric power based on the battery is supplied, and a capacitor that is connected to the electric power path. The on-board power supply apparatus includes a mechanical system main relay (first SMR), a parallel circuit, and a second relay. The system main relay (first SMR) is provided on the electric power path in a position on the battery side from the capacitor. The parallel circuit has a configuration in which a first relay and a resistance portion are connected in series, and is connected in parallel with the system main relay (first SMR). The second relay is provided in parallel with the resistance portion.

10 Claims, 3 Drawing Sheets

(51) Int. Cl.
  *H02J 1/10*       (2006.01)
  *H02J 7/34*       (2006.01)

(56) References Cited

U.S. PATENT DOCUMENTS

| | | | |
|---|---|---|---|
| 2023/0283088 A1 | 9/2023 | Isaji et al. | |
| 2023/0294621 A1* | 9/2023 | Geula | B60R 16/0232 |
| 2025/0023384 A1* | 1/2025 | Teranishi | B60R 16/03 |
| 2025/0026286 A1* | 1/2025 | Teranishi | B60R 16/033 |
| 2025/0370046 A1* | 12/2025 | Okamoto | B60R 16/03 |

* cited by examiner

ON-BOARD POWER SUPPLY APPARATUS

CROSS-REFERENCE TO RELATED APPLICATIONS

This application is the U.S. national stage of PCT/JP2022/039873 filed on Oct. 26, 2022, the contents of which is incorporated herein.

TECHNICAL FIELD

The present disclosure relates to an on-board power supply apparatus.

BACKGROUND

JP 2009-89535 discloses a power supply apparatus for vehicles. This power supply apparatus includes a contactor and a precharge circuit. The contactor switches on and off the supply of electric power to a load from a battery for traveling. The precharge circuit is connected in parallel with the contactor and precharges a capacitor. The precharge circuit includes a precharge resistor that limits a precharge current, and a precharge switch that is connected in series with the precharge resistor.

In techniques of this type, when the capacitor is precharged, time is required until the voltage of the capacitor is increased to reach a target voltage because current is limited by the precharge resistor. However, there are situations in which precharging of the capacitor is to be completed more quickly.

SUMMARY

One aim of the present disclosure is to provide a technique that can perform precharging via a resistance portion and can also complete precharging of a capacitor more quickly while suppressing damage to a system main relay.

An on-board power supply apparatus according to the present disclosure is an on-board power supply apparatus for use in an on-board power supply system including a battery, an electric power path to which electric power based on the battery is supplied, and a capacitor that is connected to the electric power path, the on-board power supply apparatus including: a mechanical system main relay that is provided on the electric power path in a position on the battery side from the capacitor; a parallel circuit that has a configuration in which a first relay and a resistance portion are connected in series, and that is provided in parallel with the system main relay; and a second relay that is provided in parallel with the resistance portion.

Advantageous Effects

The technique according to the present disclosure can perform precharging via a resistance portion and can also complete precharging of a capacitor more quickly while suppressing damage to a system main relay.

DETAILED DESCRIPTION OF PREFERRED EMBODIMENTS

Figure 1:
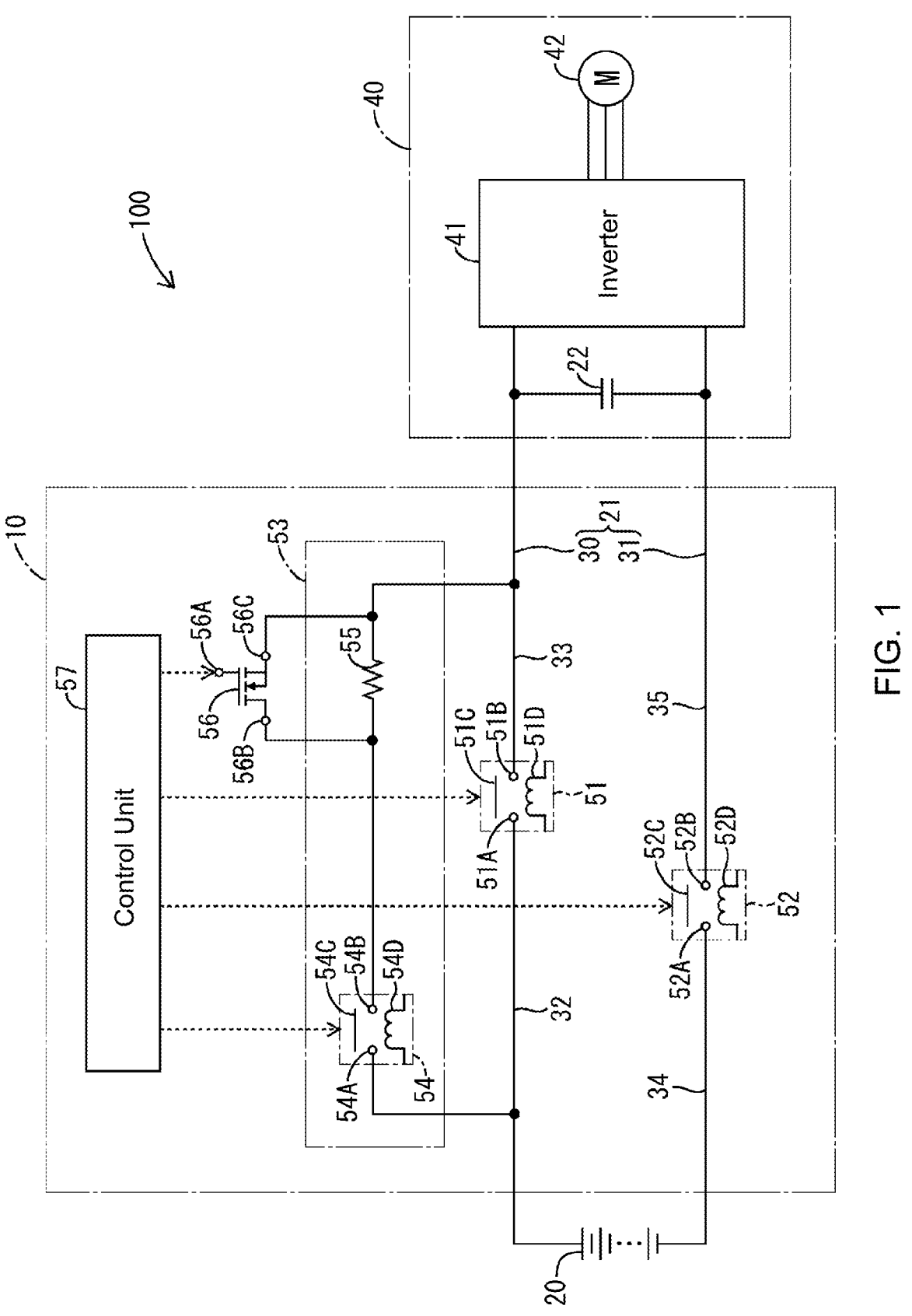
FIG. 1 is a block diagram of an on-board power supply system including an on-board power supply apparatus according to a first embodiment.

In the following, embodiments of the present disclosure will be listed and described as examples.

In a first aspect, an on-board power supply apparatus for use in an on-board power supply system including a battery, an electric power path to which electric power based on the battery is supplied, and a capacitor that is connected to the electric power path, the on-board power supply apparatus including a mechanical system main relay that is provided on the electric power path in a position on the battery side from the capacitor; a parallel circuit that has a configuration in which a first relay and a resistance portion are connected in series, and that is provided in parallel with the system main relay; and a second relay that is provided in parallel with the resistance portion.

The above-described on-board power supply apparatus can precharge the capacitor via the resistance portion when the system main relay and the second relay are off and the first relay is on. Furthermore, the above-described on-board power supply apparatus can precharge the capacitor at a higher speed in a state in which the resistance portion is bypassed when the system main relay is off and the first relay and the second relay are on. Accordingly, the above described on-board power supply apparatus can perform precharging via the resistance portion and can also complete precharging of the capacitor more quickly while suppressing damage to the system main relay.

In a second aspect, the on-board power supply apparatus according to the first aspect further including a control unit that controls the system main relay, the first relay, and the second relay, wherein the control unit: if a starting condition for starting charging or discharging of the battery is satisfied, executes first control in which the system main relay and the second relay are controlled to be off and the first relay is controlled to be on; if a first switching condition is satisfied during execution of the first control, executes second control in which the system main relay is controlled to be off and the first relay and the second relay are controlled to be on; and if a second switching condition is satisfied during execution of the second control, executes third control in which the first relay and the second relay are controlled to be off and the system main relay is controlled to be on.

By switching to the second control in a state in which the voltage of the capacitor has been increased to a certain extent by the first control, the above-described on-board power supply apparatus can switch to precharging at a higher speed while preventing an inrush current from flowing through the first relay. Thus, the above-described on-board power supply apparatus can complete precharging of the capacitor more quickly while suppressing damage to the system main relay.

In a third aspect, the on-board power supply apparatus according to the second aspect, wherein the second relay is a semiconductor relay.

Because the second relay is a contactless semiconductor relay, the above-described on-board power supply apparatus can prevent the second relay from being damaged upon switching from the first control to the second control.

In a fourth aspect, the on-board power supply apparatus according to the second or the third aspect, wherein the first switching condition is that a difference in electric potential between both ends of the system main relay or a value of a current flowing through the parallel circuit has equaled or fallen below a threshold.

The above-described on-board power supply apparatus switches to the second control after reducing the difference in electric potential between both ends of the system main relay or the value of the current flowing through the parallel circuit so as to be equal to or less than the threshold. Thus, according to the above-described on-board power supply apparatus, the maximum value of a current flowing through the second relay during the second control can be set precisely. Therefore, according to the above-described on-board power supply apparatus, a component having a rated current suitable for the second relay can be readily adopted as a constituent component of the second relay.

In a fifth aspect, the on-board power supply apparatus according to the second or the third aspect, wherein the first switching condition is that a first time amount has elapsed from the start of the first control.

The above-described on-board power supply apparatus switches to the second control once the first time amount has elapsed from the start of the first control. That is, the above-described on-board power supply apparatus switches to the second control after increasing the voltage of the capacitor to a certain extent through the first control. Thus, according to the above-described on-board power supply apparatus, the maximum value of the current flowing through the second relay during the second control can be set with a certain degree of preciseness using a simple configuration. Therefore, according to the above-described on-board power supply apparatus, a component having a rated current suitable for the second relay can be readily adopted as a constituent component of the second relay.

In a sixth aspect, the on-board power supply apparatus according to the fifth aspect, wherein the second switching condition is that a second time amount that is shorter than the first time amount has elapsed from the start of the second control.

Because a long first time amount can be readily secured, the above-described on-board power supply apparatus can readily increase the voltage of the capacitor at the time when the on-board power supply apparatus switches to the second control. Accordingly, according to the above-described on-board power supply apparatus, a component having a low rated current can be readily adopted as a constituent component of the second relay.

In a seventh aspect, the on-board power supply apparatus according to second or the third aspect, wherein the second switching condition is that the voltage of the capacitor has equaled or exceeded a threshold voltage.

The above-described on-board power supply apparatus switches to the second control after the voltage of the capacitor has equaled or exceeded the threshold voltage. That is, the above-described on-board power supply apparatus switches to the second control after the difference between the voltage of the battery and the voltage of the capacitor has decreased to some extent. Thus, according to the above-described on-board power supply apparatus, the maximum value of the current flowing through the second relay during the second control can be set with a certain degree of preciseness. Therefore, according to the above-described on-board power supply apparatus, a component having a rated current suitable for the second relay can be readily adopted as a constituent component of the second relay.

First Embodiment

Configuration of On-Board Power Supply System 100

FIG. 1 illustrates an on-board power supply system 100 including an on-board power supply apparatus 10. The vehicle in which the on-board power supply system 100 is provided may be an electric vehicle, a fuel cell vehicle (FCV), or a hybrid vehicle. The on-board power supply system 100 includes a battery 20, an electric power path 21, and a capacitor 22 besides the on-board power supply apparatus 10.

The battery 20 may be a lithium-ion battery, a lead-acid battery, or a battery of another type.

The electric power path 21 is an electrical path to which electric power based on the battery 20 is provided. The electric power path 21 includes a positive-electrode-side power line 30 and a negative-electrode side power line 31. The positive-electrode-side terminal of the battery 20 is electrically connected to the positive-electrode-side power line 30. The negative-electrode-side terminal of the battery 20 is electrically connected to the negative-electrode side power line 31. The negative-electrode-side power line 31 is electrically connected to ground. The output voltage from the battery 20 is applied to the electric power path 21 (specifically, the positive-electrode-side power line 30). Note that, voltages in the present description refer to a difference in electric potential relative to the ground potential, i.e., a difference in electric potential relative to the negative-electrode-side power line 31.

The capacitor 22 is electrically connected to the electric power path 21. The capacitor 22 is provided between the positive-electrode-side power line 30 and the negative-electrode-side power line 31. One end of the capacitor 22 is electrically connected to the positive-electrode-side power line 30. The other end of the capacitor 22 is electrically connected to the negative-electrode-side power line 31. The electric power based on the battery 20 is supplied to the capacitor 22 via the electric power path 21. The capacitor 22 smooths the voltage based on the battery 20.

In the present embodiment, the capacitor 22 is configured as part of a drive unit 40 provided in the on-board power supply system 100. The drive unit 40 includes an inverter 41 and a motor 42 besides the capacitor 22. The capacitor 22 is provided on the battery 20 side from the inverter 41. The capacitor 22 smooths the voltage based on the battery 20 and supplies the smoothed voltage to the inverter 41. The inverter 41 is electrically connected to the electric power path 21. The inverter 41 generates an AC voltage (for example, a three-phase AC) from a DC voltage based on the voltage supplied from the battery 20, and supplies the AC voltage to the motor 42. For example, the motor 42 is a main engine system motor. The motor 42 is a device that rotates based on the electric power supplied from the battery 20 and applies a rotational force to wheels of the vehicle.

The on-board power supply apparatus 10 is for use in the on-board power supply system 100. The on-board power supply apparatus 10 includes a first system main relay 51 (hereinafter "first SMR 51") and a second system main relay 52 (hereinafter "second SMR 52").

The first SMR 51 is an example of the "system main relay". The first SMR 51 is provided on the electric power path 21 in a position on the battery 20 side from the capacitor 22. The first SMR 51 is provided on the positive-electrode-side power line 30. One end of the first SMR 51 is electrically connected to the positive-electrode-side terminal of the battery 20, and is directly connected to the positive-electrode-side terminal of the battery 20. The other end of the first SMR 51 is electrically connected to the one end of the capacitor 22, and is directly connected to the one end of the capacitor 22. In the present embodiment, the first SMR 51 is a mechanical relay. The first SMR 51 includes contacts 51A, 51B, and 51C. The first SMR 51 includes fixed contacts 51A and 51B, a moving contact 51C, and a coil 51D that actuates the moving contact 51C. The first SMR 51 places the moving contact 51C in contact with the fixed contacts 51A and 51B when the coil 51D is energized, whereby the first SMR 51 switches on. Furthermore, the first SMR 51 separates the moving contact 51C from the fixed contacts 51A and 51B when the coil 51D is not energized, whereby the first SMR 51 switches off.

The second SMR 52 is provided on the electric power path 21 in a position on the battery 20 side from the capacitor 22. The second SMR 52 is provided on the negative-electrode-side power line 31. One end of the second SMR 52 is electrically connected to the negative-electrode-side terminal of the battery 20, and is directly connected to the negative-electrode-side terminal of the battery 20. The other end of the second SMR 52 is electrically connected to the other end of the capacitor 22, and is directly connected to the other end of the capacitor 22. In the present embodiment, the second SMR 52 is a mechanical relay. The second SMR 52 includes contacts 52A, 52B, and 52C. The second SMR 52 includes fixed contacts 52A and 52B, a moving contact 52C, and a coil 52D that actuates the moving contact 52C. The second SMR 52 places the moving contact 52C in contact with the fixed contacts 52A and 52B when the coil 52D is energized, whereby the second SMR 52 switches on. Furthermore, the second SMR 52 separates the moving contact 52C from the fixed contacts 52A and 52B when the coil 52D is not energized, whereby the second SMR 52 switches off.

The above-described positive-electrode-side power line 30 includes a first positive-electrode-side power line 32 that is provided on the battery 20 side of the first SMR 51, and a second positive-electrode-side power line 33 that is provided on the opposite side of the first SMR 51 from the battery 20 side. The above-described negative-electrode-side power line 31 includes a first negative-electrode-side power line 34 that is provided on the battery 20 side of the second SMR 52, and a second negative-electrode-side power line 35 that is provided on the opposite side of the second SMR 52 from the battery 20 side.

The on-board power supply apparatus 10 includes a parallel circuit 53. The parallel circuit 53 is provided in parallel with the first SMR 51. One end of the parallel circuit 53 is electrically connected to the first positive-electrode-side power line 32, and is directly connected to the first positive electrode-side power line 32. The other end of the parallel circuit 53 is electrically connected to the second positive-electrode-side power line 33, and is directly connected to the second positive-electrode-side power line 33. The parallel circuit 53 has a configuration in which a first relay 54 and a resistance portion 55 are connected in series.

In the present embodiment, the first relay 54 is a mechanical relay. The first relay 54 includes contacts 54A, 54B, and 54C. The first relay 54 includes fixed contacts 54A and 54B, a moving contact 54C, and a coil 54D that actuates the moving contact 54C. The first relay 54 places the moving contact 54C in contact with the fixed contacts 54A and 54B when the coil 54D is energized, whereby the first relay 54 switches on. Furthermore, the first relay 54 separates the moving contact 54C from the fixed contacts 54A and 54B when the coil 54D is not energized, whereby the first relay 54 switches off.

For example, the resistance portion 55 is formed from a known resistor.

The on-board power supply apparatus 10 includes a second relay 56. The second relay 56 is provided in parallel with the resistance portion 55. In the present embodiment, the second relay 56 is a semiconductor relay. In the present embodiment, the second relay 56 is an N-channel metal-oxide-semiconductor field effect transistor (MOSFET). The second relay 56 includes an input portion 56A (gate in the present embodiment). The second relay 56 switches on when an on signal (high-level signal in the present embodiment) is provided to the input portion 56A, and switches off when an off signal (low-level signal in the present embodiment) is provided to the input portion 56A. A drain 56B of the second relay 56 is electrically connected to a first-positive-electrode-side power-line-32-side end portion of the resistance portion 55, and is directly connected to the first-positive-electrode-side-power-line-32-side end portion of the resistance portion 55. A source 56C of the second relay 56 is electrically connected to a second-positive-electrode-side-power-line-33-side end portion of the resistance portion 55, and is directly connected to the second-positive-electrode-side-power-line-33-side end portion of the resistance portion 55.

Configuration of Control Unit 57 of On-Board Power Supply Apparatus 10

The on-board power supply apparatus 10 includes a control unit 57. The control unit 57 is configured to include a control circuit such as an integrated circuit, for example. The control unit 57 includes a processing unit such as a CPU, a storage unit such as a memory, an I/O unit, etc. The control unit 57 controls the first SMR 51, the second SMR 52, the first relay 54, and the second relay 56.

The control unit 57 executes first control if a starting condition for starting charging or discharging of the battery 20 is satisfied. The starting condition is satisfied when the first SMR 51, the second SMR 52, the first relay 54, and the second relay 56 are off. The first control is control in which the first SMR 51 and the second relay 56 are controlled to be off, and the second SMR 52 and the first relay 54 are controlled to be on. Furthermore, the first control is control in which the second SMR 52 and the first relay 54 are switched on while the first SMR 51 and the second relay 56 are kept off. In a state in which the first control has been executed, the electric power based on the battery 20 is supplied to the capacitor 22 via the parallel circuit 53. According to this configuration, the current flowing through the electric power path 21 is limited by the resistance portion 55 of the parallel circuit 53. Thus, the capacitor 22 can be charged while suppressing damage to the first SMR 51, the second SMR 52, and the first relay 54. As the voltage of the capacitor 22 increases, the difference between the voltage of the capacitor 22 and the voltage of the battery 20 decreases. Consequently, the difference in electric potential between both ends of the first SMR 51 decreases, and the difference in electric potential between both ends of the second SMR 52 decreases.

The control unit 57 executes second control if a first switching condition is satisfied during execution of the first control. The second control is control in which the first SMR 51 is controlled to be off, and the second SMR 52, the first relay 54, and the second relay 56 are controlled to be on. Furthermore, the second control is control in which the second relay 56 is switched on while the first SMR 51 is kept off and the second SMR 52 and the first relay 54 are kept on.

The first switching condition is a condition that is satisfied if the current flowing through the parallel circuit 53 is equal to or less than the rated current of the second relay 56, for example. The first switching condition is a condition that is set so as to be satisfied when the current flowing through the parallel circuit 53 equals or falls below the rated current of the second relay 56, for example.

Example 1 of the first switching condition is that the difference in electric potential between both ends of the first SMR 51 has equaled or fallen below a first threshold. The control unit 57 acquires the difference in electric potential between both ends of the first SMR 51, and determines whether or not the acquired difference in electric potential has equaled or fallen below the first threshold. The method according to which the control unit 57 acquires the difference in electric potential between both ends of the first SMR 51 is not limited. For example, the control unit 57 may acquire the difference in electric potential between both ends of the first SMR 51 by receiving a signal obtained by amplifying the difference in electric potential between both ends of the first SMR 51 using a differential amplifier. Alternatively, the control unit 57 may acquire the difference in electric potential between both ends of the first SMR 51 by separately acquiring the voltages of the battery 20 and the capacitor 22 and calculating the difference between the acquired voltages.

In a case in which the first switching condition is example 1, the on-board power supply apparatus 10 switches to the second control after reducing the difference in electric potential between both ends of the first SMR 51 so as to be equal to or less than the first threshold. Thus, according to the on-board power supply apparatus 10, the maximum value of the current flowing through the second relay 56 during the second control can be set precisely. Therefore, according to the on-board power supply apparatus 10, a component having a rated current suitable for the second relay 56 can be readily adopted as a constituent component of the second relay 56.

Example 2 of the first switching condition is that the value of the current flowing through the parallel circuit 53 has equaled or fallen below a first threshold. The control unit 57 acquires the value of the current flowing through the parallel circuit 53, and determines whether or not the acquired current value has equaled or fallen below the first threshold. The method according to which the control unit 57 acquires the value of the current flowing through the parallel circuit 53 is not limited. For example, a configuration may be adopted such that a current sensor for detecting the current flowing through the parallel circuit 53 is provided in the on-board power supply system 100, and the control unit 57 acquires the value detected by the current sensor.

In a case in which the first switching condition is example 2, the on-board power supply apparatus 10 switches to the second control after reducing the value of the current flowing through the parallel circuit 53 so as to be equal to or less than the first threshold. Thus, according to the on-board power supply apparatus 10, the maximum value of the current flowing through the second relay 56 during the second control can be set precisely. Therefore, according to the on-board power supply apparatus 10, a component having a rated current suitable for the second relay 56 can be readily adopted as a constituent component of the second relay 56.

Example 3 of the first switching condition is that a first time amount has elapsed from the start of the first control.

In a case in which the first switching condition is example 3, the on-board power supply apparatus 10 switches to the second control once the first time amount has elapsed from the start of the first control. That is, the on-board power supply apparatus 10 switches to the second control after increasing the voltage of the capacitor 22 to a certain extent through the first control. Thus, according to the on-board power supply apparatus 10, the maximum value of the current flowing through the second relay 56 during the second control can be set with a certain degree of preciseness using a simple configuration. Therefore, according to the on-board power supply apparatus 10, a component having a rated current suitable for the second relay 56 can be readily adopted as a constituent component of the second relay 56.

Example 4 of the first switching condition is that the voltage of the capacitor 22 has equaled or exceeded a first threshold voltage. The control unit 57 acquires the voltage of the capacitor 22, and determines whether or not the acquired voltage has equaled or exceeded the first threshold. The method according to which the control unit 57 acquires the voltage of the capacitor 22 is not limited. For example, the control unit 57 may acquire a voltage of the capacitor 22 detected by a known voltage detection circuit.

In a case in which the first switching condition is example 4, the on-board power supply apparatus 10 switches to the second control after the voltage of the capacitor 22 has equaled or exceeded the first threshold voltage. That is, the on-board power supply apparatus 10 switches to the second control after the difference between the voltages of the battery 20 and the capacitor 22 has decreased to some extent. Thus, according to the on-board power supply apparatus 10, the maximum value of the current flowing through the second relay 56 during the second control can be set with a certain degree of preciseness. Therefore, according to the on-board power supply apparatus 10, a component having a rated current suitable for the second relay 56 can be readily adopted as a constituent component of the second relay 56.

The control unit 57 executes third control if a second switching condition is satisfied during execution of the second control. The third control is control in which the first relay 54 and the second relay 56 are controlled to be off, and the first SMR 51 and the second SMR 52 are controlled to be on. Furthermore, the third control is control in which the first relay 54 and the second relay 56 are switched off and the first SMR 51 is switched on while the second SMR 52 is kept on.

The second switching condition is a condition that is satisfied if the difference in electric potential between both ends of the first SMR 51 is equal to or less than a target value, for example. The second switching condition is a condition that is set so as to be satisfied when the difference in electric potential between both ends of the first SMR 51 has equaled or fallen below the target value, for example. For example, the target value is 0.

Example 1 of the second switching condition is that the difference in electric potential between both ends of the first SMR 51 has equaled or fallen below a second threshold. In a case in which the first switching condition is example 1, the second threshold is a value less than the first threshold. The control unit 57 acquires the difference in electric potential between both ends of the first SMR 51, and determines whether or not the acquired difference in electric potential has equaled or fallen below the second threshold. The method according to which the control unit 57 acquires the difference in electric potential between both ends of the first SMR 51 is not limited, and may be the same as that for example 1 of the first switching condition, for example.

In a case in which the second switching condition is example 1, the on-board power supply apparatus 10 switches to the third control after reducing the difference in electric potential between both ends of the first SMR 51 so as to be equal to or less than the second threshold. Thus, the on-board power supply apparatus 10 can prevent an inrush current from flowing through the first SMR 51 with a higher degree of certainty.

Example 2 of the second switching condition is that the value of the current flowing through the parallel circuit 53 has equaled or fallen below a second threshold. In a case in which the first switching condition is example 2, the second threshold is a value less than the first threshold. The control unit 57 acquires the value of the current flowing through the parallel circuit 53, and determines whether or not the acquired current value has equaled or fallen below the second threshold. The method according to which the control unit 57 acquires the value of the current flowing through the parallel circuit 53 is not limited, and may be the same as that for example 2 of the first switching condition, for example.

In a case in which the second switching condition is example 2, the on-board power supply apparatus 10 switches to the third control after reducing the value of the current flowing through the parallel circuit 53 so as to be equal to or less than the second threshold. Thus, the on-board power supply apparatus 10 can prevent an inrush current from flowing through the first SMR 51 with a higher degree of certainty.

Example 3 of the second switching condition is that a second time amount has elapsed from the start of the second control. In a case in which the first switching condition is example 3, the second time amount is a time amount shorter than the first time amount, for example. In this case, because a long first time amount can be readily secured, the on-board power supply apparatus 10 can readily increase the voltage of the capacitor 22 at the time when the on-board power supply apparatus 10 switches to the second control. Accordingly, according to the on-board power supply apparatus 10, a component having a low rated current can be readily adopted as a constituent component of the second relay 56.

In a case in which the second switching condition is example 3, the determination of whether or not the second switching condition has been satisfied can be readily simplified in the on-board power supply apparatus 10.

Example 4 of the second switching condition is that the voltage of the capacitor 22 has equaled or exceeded a second threshold voltage. In a case in which the first switching condition is example 4, the second threshold voltage is a value that is more than the first threshold voltage. The control unit 57 acquires the voltage of the capacitor 22, and determines whether or not the acquired voltage has equaled or exceeded the first threshold. The method according to which the control unit 57 acquires the voltage of the capacitor 22 is not limited, and may be the same as that for example 4 of the first switching condition, for example.

In a case in which the second switching condition is example 4, the on-board power supply apparatus 10 can switch on the first SMR 51 after reducing the difference in electric potential between the voltages of the capacitor 22 and the battery 20 to some extent without monitoring the difference in electric potential. Thus, the on-board power supply apparatus 10 can suppress damage to the first SMR 51 caused by the first SMR 51 being switched on to some extent using a simple configuration.

Operation of On-Board Power Supply Apparatus 10

Figure 2:
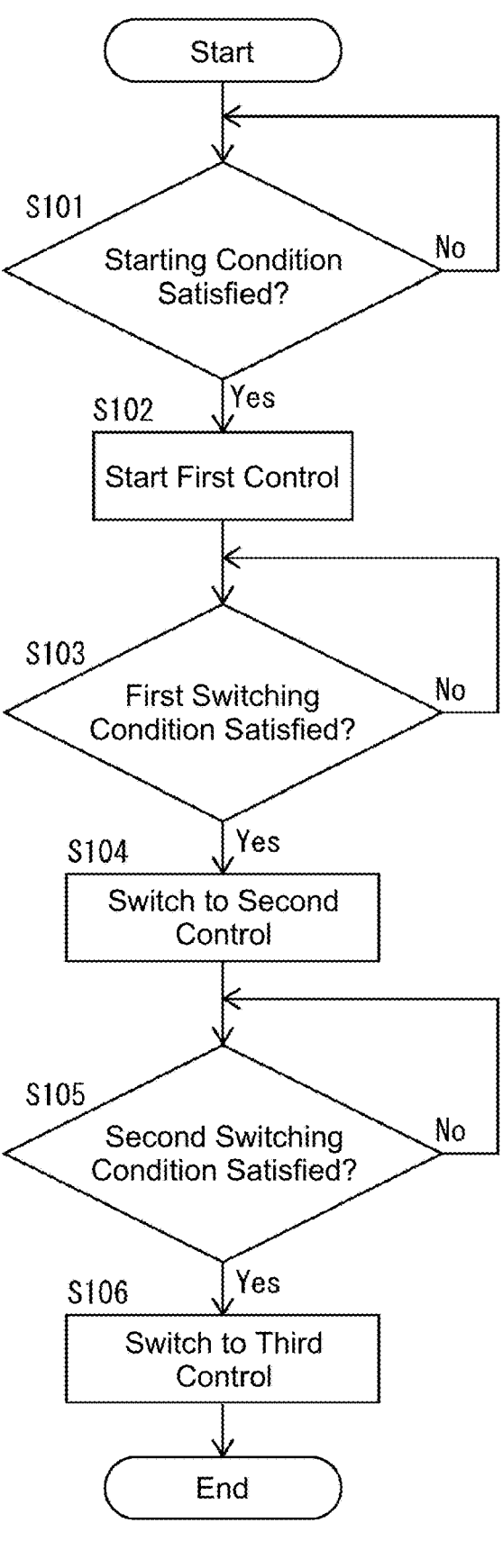
FIG. 2 is a flowchart illustrating a flow of processing executed by the on-board power supply apparatus according to the first embodiment.

The control unit 57 of the on-board power supply apparatus 10 executes the processing illustrated in FIG. 2. For example, the control unit 57 starts the processing illustrated in FIG. 2 if the first SMR 51, the second SMR 52, the first relay 54, and the second relay 56 are off.

In step S101, the control unit 57 determines whether or not the above-described starting condition has been satisfied. The control unit 57 determines that the starting condition has been satisfied upon receiving an instruction to start charging or discharging from a higher-level ECU, for example. Upon determining that the starting condition has not been satisfied (No in step S101), the control unit 57 repeats the processing in step S101 until the starting condition is satisfied.

Upon determining that the starting condition has been satisfied (Yes in step S101), the control unit 57 starts the first control in step S102. That is, the control unit 57 switches on the second SMR 52 and the first relay 54 while keeping the first SMR 51 and the second relay 56 off. Thus, the electric power based on the battery 20 is supplied to the capacitor 22 via the parallel circuit 53. That is, a current limited by the resistance portion 55 flows through the electric power path 21 to be supplied to the capacitor 22.

The control unit 57 executes the processing in step S103 during execution of the first control. In step S103, the control unit 57 determines whether or not the above-described first switching condition has been satisfied. Upon determining that the first switching condition has not been satisfied (No in step S103), the control unit 57 repeats the processing in step S103 until the first switching condition is satisfied. During this time, the voltage of the capacitor 22 gradually increases and the difference in electric potential between both ends of the first SMR 51 gradually decreases.

Upon determining that the first switching condition has been satisfied (Yes in step S103), the control unit 57 switches to the second control in step S104. That is, the control unit 57 switches on the second relay 56 while keeping the first SMR 51 off and the second SMR 52 on. Thus, the electric power based on the battery 20 is supplied to the capacitor 22 in a state in which the resistance portion 55 is bypassed. That is, a current based on the battery 20 is supplied to the capacitor 22 without being limited by the resistance portion 55.

The control unit 57 executes the processing in step S105 during execution of the second control. In step S105, the control unit 57 determines whether or not the above-described second switching condition has been satisfied. Upon determining that the second switching condition has not been satisfied (No in step S105), the control unit 57 repeats the processing in step S105 until the second switching condition is satisfied. During this time, the voltage of the capacitor 22 further increases and the difference in electric potential between both ends of the first SMR 51 further decreases.

Upon determining that the second switching condition has been satisfied (Yes in step S105), the control unit 57 switches to the third control in step S106. That is, the control unit 57 switches off the first relay 54 and the second relay 56 and switches on the first SMR 51 while keeping the second SMR 52 on. Damage to the first SMR 51 is suppressed as a result of the first SMR 51 switching on in a state in which the difference in electric potential between both ends of the first SMR 51 has decreased. As a result of the third control being executed, the electric power based on the battery 20 is supplied to the electric power path 21 via the first SMR 51 and is supplied to the drive unit 40 via the electric power path 21.

The control unit 57 terminates the processing illustrated in FIG. 2 after switching to the third control.

Figure 3:
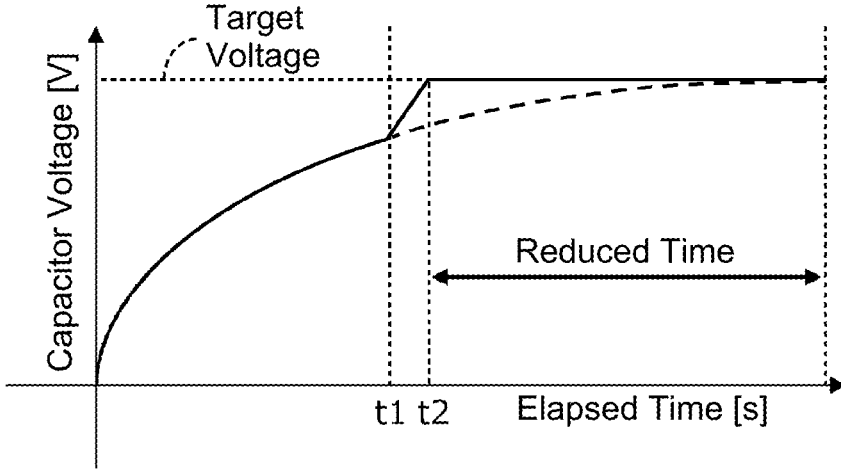
FIG. 3 is an explanatory diagram illustrating an example of a change in capacitor voltage over time.

In FIG. 3, the change in the voltage of the capacitor 22 over time is illustrated by a solid line. The voltage of the capacitor 22 gradually increases from 0 V once the starting condition is satisfied and the first control is started. The rate of increase of the voltage of the capacitor 22 slows down as the voltage of the capacitor 22 approaches the voltage of the battery 20. The control unit 57 switches to the second control at timing t1, which is a timing when the rate of increase of the voltage of the capacitor 22 has slowed down. Thus, the rate of increase of the voltage of the capacitor 22 is accelerated, and the voltage of the capacitor 22 reaches the target voltage at timing t2. If the control unit 57 were not to switch to the second control at timing t1, a considerable amount of time would be required until the voltage of the capacitor 22 reaches the target voltage, as could be seen from the curve illustrated by a dashed line. In contrast, by switching to the second control at timing t1, the on-board power supply apparatus 10 can significantly reduce the time required until the voltage of the capacitor 22 reaches the target voltage.

Examples of Effects

The on-board power supply apparatus 10 can precharge the capacitor 22 via the resistance portion 55 when the first SMR 51 and the second relay 56 are off and the first relay 54 is on. Furthermore, the on-board power supply apparatus 10 can precharge the capacitor 22 at a higher speed in a state in which the resistance portion 55 is bypassed when the first SMR 51 is off and the first relay 54 and the second relay 56 are on. Accordingly, the on-board power supply apparatus 10 can perform precharging via the resistance portion 55 and can also complete precharging of the capacitor 22 more quickly while suppressing damage to the first SMR 51.

By switching to the second control in a state in which the voltage of the capacitor 22 has been increased to a certain extent by the first control, the on-board power supply apparatus 10 can switch to precharging at a higher speed while preventing an inrush current from flowing through the first relay 54. Thus, the on-board power supply apparatus 10 can complete precharging of the capacitor 22 more quickly while suppressing damage to the first SMR 51.

Because the second relay 56 is a contactless semiconductor relay, the on-board power supply apparatus 10 can prevent the second relay 56 from being damaged upon switching from the first control to the second control.

Other Embodiments

The present disclosure is not limited to the embodiments that have been described by way of the drawings and the description above. For example, features of the embodiments described up to this point and in the following can be combined in any way as long as there is no contradiction. Furthermore, the features of the embodiments described up to this point and in the following can also be omitted unless it is explicitly indicated that the features are essential. Furthermore, the above-described embodiments may be modified as follows.

In each of the above-described embodiments, the second SMR 52 need not be provided.

In each of the above-described embodiments, a configuration is adopted in which the first SMR 51 is an example of the system main relay; however, the second SMR 52 may be an example of the system main relay. In this case, the parallel circuit 53 would be provided in parallel with the second SMR 52. In this case, the first SMR 51 need not be provided.

In each of the above-described embodiments, the first relay 54 is a mechanical relay; however, the first relay 54 may be a semiconductor relay. In each of the above-described embodiments, the second relay 56 is a semiconductor relay; however, the second relay 56 may be a mechanical relay.

Note that the embodiments disclosed herein are examples in every way, and shall be construed as being non-limiting. The scope of the present disclosure is not limited to the embodiments disclosed herein, and is intended to include all modifications within the scope indicated by the claims or within the scope of equivalents of the claims.

The invention claimed is:

1. An on-board power supply apparatus for use in an on-board power supply system including a battery, an electric power path to which electric power based on the battery is supplied, and a capacitor that is connected to the electric power path, the on-board power supply apparatus comprising:
   a mechanical system main relay that is provided on the electric power path in a position on the battery side from the capacitor;
   a parallel circuit that has a configuration in which a first relay and a resistance portion are connected in series, and that is provided in parallel with the system main relay; and
   a second relay that is provided in parallel with the resistance portion.

2. The on-board power supply apparatus according to claim 1 further comprising
   a control unit that controls the system main relay, the first relay, and the second relay,
   wherein the control unit:
      if a starting condition for starting charging or discharging of the battery is satisfied, executes first control in which the system main relay and the second relay are controlled to be off and the first relay is controlled to be on;
      if a first switching condition is satisfied during execution of the first control, executes second control in which the system main relay is controlled to be off and the first relay and the second relay are controlled to be on; and
      if a second switching condition is satisfied during execution of the second control, executes third control in which the first relay and the second relay are controlled to be off and the system main relay is controlled to be on.

3. The on-board power supply apparatus according to claim 2, wherein the second relay is a semiconductor relay.

4. The on-board power supply apparatus according to claim 2, wherein the first switching condition is that a difference in electric potential between both ends of the system main relay or a value of a current flowing through the parallel circuit has equaled or fallen below a threshold.

5. The on-board power supply apparatus according to claim 2, wherein the first switching condition is that a first time amount has elapsed from the start of the first control.

6. The on-board power supply apparatus according to claim 5, wherein the second switching condition is that a second time amount that is shorter than the first time amount has elapsed from the start of the second control.

7. The on-board power supply apparatus according to claim 2, wherein the second switching condition is that the voltage of the capacitor has equaled or exceeded a threshold voltage.

8. The on-board power supply apparatus according to claim 3, wherein the first switching condition is that a difference in electric potential between both ends of the system main relay or a value of a current flowing through the parallel circuit has equaled or fallen below a threshold.

9. The on-board power supply apparatus according to claim 3, wherein the first switching condition is that a first time amount has elapsed from the start of the first control.

10. The on-board power supply apparatus according to claim 3, wherein the second switching condition is that the voltage of the capacitor has equaled or exceeded a threshold voltage.

* * * * *